United States Patent
Tav et al.

(10) Patent No.: US 11,290,432 B2
(45) Date of Patent: Mar. 29, 2022

(54) SECURE DATA TRANSFER ARCHITECTURE FOR BENCHMARKING

(71) Applicant: International Business Machines Corporation, Armonk, NY (US)

(72) Inventors: Doga Tav, Fredericton (CA); Wayne F. Tackabury, West Tisbury, MA (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 16/208,971

(22) Filed: Dec. 4, 2018

(65) Prior Publication Data

US 2020/0177562 A1 Jun. 4, 2020

(51) Int. Cl.
| G06F 11/36 | (2006.01) |
| G06F 21/60 | (2013.01) |
| G06F 21/62 | (2013.01) |
| H04L 29/06 | (2006.01) |
| H04L 9/08 | (2006.01) |
| H04L 45/02 | (2022.01) |

(52) U.S. Cl.
CPC ...... *H04L 63/0435* (2013.01); *G06F 11/3688* (2013.01); *G06F 21/602* (2013.01); *G06F 21/62* (2013.01); *H04L 9/083* (2013.01); *H04L 9/088* (2013.01); *H04L 9/0891* (2013.01); *H04L 45/026* (2013.01)

(58) Field of Classification Search
CPC ....... H04L 3/0435; H04L 9/083; H04L 9/088; H04L 45/026; G06F 1/3688; G06F 21/62
See application file for complete search history.

(56) References Cited

U.S. PATENT DOCUMENTS

| 6,363,477 B1 * | 3/2002 | Fletcher | H04L 43/106 709/223 |
| 6,523,118 B1 * | 2/2003 | Buer | G06F 21/71 380/28 |
| 6,742,119 B1 * | 5/2004 | Peyravian | H04L 9/3297 380/277 |

(Continued)

OTHER PUBLICATIONS

Wilson, "Centralized UNIX System Monitoring using SSH and MRTG". SANS Institute, 2002. Retrieved from the Internet: URL: https://www.sans.org/reading-room/whitepapers/unix/centralized-unix-system-monitoring-sshmrtg-332 [retrieved on Dec. 3, 2018].

(Continued)

*Primary Examiner* — Yin Chen Shaw
*Assistant Examiner* — Alex D Carrasquillo
(74) *Attorney, Agent, or Firm* — Troutman Pepper Hamilton Sanders LLP (57) ABSTRACT

Embodiments are directed to a method of transferring data between a customer site and a benchmarking site, including: receiving, from the customer site, encrypted packet data, wherein the packet data is encrypted using a first key of a key pair; storing the encrypted packet data, by the processor, in a first cache at the benchmarking site; decrypting the encrypted packet data in the first cache, by the processor, using a second key of the key pair; storing decrypted packet data, by the processor, in a second cache at the benchmarking site; indexing the decrypted packet data in the second cache; storing indexed packet data as a dataset in a permanent storage device; and performing a benchmarking session on the indexed packet data.

15 Claims, 5 Drawing Sheets

(56) References Cited

U.S. PATENT DOCUMENTS

| | | | | |
|---|---|---|---|---|
| 6,813,358 | B1* | 11/2004 | Di Crescenzo | H04L 63/0428 380/277 |
| 8,032,564 | B2* | 10/2011 | Muret | C07K 14/705 707/803 |
| 8,898,464 | B2* | 11/2014 | Bono | H04L 63/061 713/168 |
| 9,379,890 | B1* | 6/2016 | Blakely | H04L 9/0897 |
| 9,720,839 | B2* | 8/2017 | Avudaiyappan | G06F 12/0895 |
| 9,928,174 | B1* | 3/2018 | Connell | G06F 12/0815 |
| 2005/0091540 | A1* | 4/2005 | Dick | H04L 63/0428 726/4 |
| 2006/0136732 | A1* | 6/2006 | Vandermolen | G06F 21/10 713/178 |
| 2009/0214040 | A1 | 8/2009 | Funk et al. | |
| 2010/0281223 | A1* | 11/2010 | Wolfe | G06F 12/1408 711/133 |
| 2014/0101438 | A1* | 4/2014 | Elovici | H04L 9/14 713/155 |
| 2015/0278066 | A1* | 10/2015 | France | G06F 11/3452 709/224 |
| 2016/0188494 | A1* | 6/2016 | Boivie | G06F 12/1408 713/193 |
| 2017/0139842 | A1* | 5/2017 | Moriguchi | G06F 12/0802 |
| 2017/0206372 | A1* | 7/2017 | Jung | G06F 16/951 |
| 2017/0317818 | A1* | 11/2017 | Kurian | G06F 11/07 |
| 2018/0024942 | A1* | 1/2018 | Canepa | H04L 9/0838 713/193 |
| 2018/0054302 | A1* | 2/2018 | Shveykin | H04L 63/0435 |
| 2018/0063102 | A1* | 3/2018 | Secatch | H04L 9/0891 |
| 2019/0097788 | A1* | 3/2019 | Howe | H04L 9/0618 |
| 2019/0097791 | A1* | 3/2019 | Hersans | G06F 12/0875 |
| 2019/0097798 | A1* | 3/2019 | Hunt | H04L 9/0891 |
| 2019/0171829 | A1 | 6/2019 | Tackabury et al. | |

OTHER PUBLICATIONS

Schroepfer, Schaad, Kerschbaum, Boehm, Joos: Secure Benchmarking in the Cloud, 2013. Retrieved from the Internet: URL: http://fkerschbaum.org/sacmat13.pdf [retrieved on Dec. 3, 2018].

Harkins, Carell: "The Internet Key Exchange (IKE)", RFC 2409, 1998. Retrieved from the Internet: URL: https://tools.ietf.org/rfc/rfc2409.txt [retrieved on Dec. 3, 2018].

Gelashivili, "Attacks on re-keying and renegotation in Key Exchange Protocols", Eidgenossishe Technische Hochschule Zurich, May 2012. Retrieved from the Internet: URL: http://www.cs.toronto.edu/~gelash/Thesis.pdf [retrieved on Dec. 3, 2018].

Apache Solr, v.7.2.1, 2017. Retrieved from the Internet: URL: http://lucene.apache.org/solr/ [retrieved on Dec. 3, 2018].

"Regulation (EU) 2016/679 of the European Parliament and of the Council", Apr. 27, 2016. Retrieved from the Internet: URL: https://eur-lex.europa.eu/legal-content/EN/TXT/PDF/?uri=CELEXS:32016R0679&from=EN [retrieved on Dec. 3, 2018].

* cited by examiner

SECURE DATA TRANSFER ARCHITECTURE FOR BENCHMARKING

BACKGROUND

One of the biggest challenges in performance testing of network software systems is performance consistency with customer data. Due to the nature of in-house testing and confidentially concerns, software tests performed prior to releasing software (especially security market software) cannot provide 100% coverage of all customer data, and thus the software to be released may be inconsistent with the customer data.

Thus, there is a need to secure the customer data through a network, so that the software to be released can be benchmarked with the customer data. However, it is challenging to secure the customer data without compromising confidentiality of the customer data, in terms of risks of content exfiltration or access by non-trusted systems. European Union General Data Protection Regulation (GDPR) specifies a framework and regulatory basis for all data-handling stakeholders, e.g., network software systems providers in acquisition and retention of the customer data for regression and performance tests. Therefore, a secure data transfer architecture for benchmarking is needed to secure the customer data in compliance with GDPR.

SUMMARY

Embodiments provide a computer implemented method in a data processing system comprising a processor and a memory comprising instructions, which are executed by the processor to cause the processor to implement the method of transferring data between a customer site and a benchmarking site, comprising: receiving, from the customer site, encrypted packet data, wherein the packet data is encrypted using a first key of a key pair; storing the encrypted packet data, by the processor, in a first cache at the benchmarking site; decrypting the encrypted packet data in the first cache, by the processor, using a second key of the key pair; storing decrypted packet data, by the processor, in a second cache at the benchmarking site; indexing the decrypted packet data in the second cache; storing indexed packet data as a dataset in a permanent storage device; and performing a benchmarking session on the indexed packet data.

Embodiments provide a computer implemented method, further comprising: providing the key pair with a Time to Live (TTL) value, and if the TTL value is met, disabling the key pair; wherein the indexed packet data associated with the disabled key pair is unavailable.

Embodiments provide a computer implemented method, further comprising: extending the TTL value; and enabling the key pair; wherein the indexed packet data associated with the enabled key pair is available.

Embodiments provide a computer implemented method, further comprising: collecting the packet data at the customer site, wherein the packet data is collected within a predetermined time period; encrypting the predetermined time period of the packet data using the first key of the key pair at the customer site; and transferring the encrypted packet data to the benchmarking site.

Embodiments provide a computer implemented method, further comprising: collecting a first predetermined time period of the packet data at the customer site; encrypting the first predetermined time period of the packet data using a first key of a first key pair at the customer site; transferring the first encrypted packet data to the benchmarking site; collecting a second predetermined time period of the packet data at the customer site; encrypting the second predetermined time period of the packet data using a first key of a second key pair at the customer site; and transferring the second encrypted packet data to the benchmarking site. Wherein the first predetermined time period of the packet data is stored as a first dataset in the permanent storage device; and the second predetermined time period of the packet data is stored as a second dataset in the permanent storage device.

Embodiments provide a computer implemented method, wherein data sets are stored as different shards in the permanent storage device.

Embodiments provide a computer implemented method, wherein a first key pair is provided with a first TTL value, and the second key pair is provided with a second TTL value.

Embodiments further provide a system for transferring packet data between a customer site and a benchmarking site, the system comprising: a first cache located at the benchmarking site, and configured for storing the packet data in an encrypted form; a second cache located at the benchmarking site, and configured for storing the packet data in a cleartext form; a relational database located at the benchmarking site, configured for storing indexed packet data; and a data transfer processor configured to: receive, from the customer site, encrypted packet data, wherein the packet data is encrypted using a first key of a key pair; store the encrypted packet data in the first cache; decrypt the encrypted packet data in the first cache using a second key of the key pair; store decrypted packet data in the second cache; index the decrypted packet data in the second cache; store the indexed packet data as a dataset in the relational database; and perform a benchmarking session on the indexed packet data.

Embodiments further provide a system for transferring packet data between a customer site and a benchmarking site, wherein the data transfer processor is further configured to: provide the key pair with a Time to Live (TTL) value, and if the TTL value is met, disable the key pair; wherein the indexed packet data associated with the key pair is unavailable.

Embodiments further provide a system for transferring packet data between a customer site and a benchmarking site, wherein the dataset is a SOLR data set.

Embodiments further provide a system for transferring packet data between a customer site and a benchmarking site, wherein the data transfer processor is further configured to: collect the packet data at the customer site, wherein the packet data is collected within a predetermined time period; encrypt the predetermined time period of the packet data using the first key of a key pair at the customer site; and transfer the encrypted packet data to the benchmarking site.

Embodiments further provide a system for transferring packet data between a customer site and a benchmarking site, wherein the data transfer processor is further configured to: collect a first predetermined time period of the packet data at the customer site; encrypt the first predetermined time period of the packet data using a first key of a first key pair at the customer site; transfer the first encrypted packet data to the benchmarking site; collect a second predetermined time period of the packet data at the customer site; encrypt the second predetermined time period of the packet data using a first key of a second key pair at the customer site; and transfer the second encrypted packet data to the benchmarking site. Wherein the first predetermined time period of the packet data is stored as a first dataset in the relational database; and the second predetermined time period of the packet data is stored as a second dataset in the relational database.

Embodiments further provide a system for transferring packet data between a customer site and a benchmarking site, wherein data sets are stored as different shards in the relational database.

Embodiments further provide a system for transferring packet data between a customer site and a benchmarking site, wherein the data transfer processor is further configured to: cancel the benchmarking session; and remove the indexed packet data from the benchmarking site.

Embodiments further provide a computer program product for reading skill assessment, the computer program product comprising a computer readable storage medium having program instructions embodied therewith, the program instructions executable by a processor to cause the processor to receive, from the customer site, encrypted packet data, wherein the packet data is encrypted using a first key of a key pair; store the encrypted packet data in a first cache at the benchmarking site; decrypt the encrypted packet data in the first cache using a second key of the key pair; store decrypted packet data in a second cache at the benchmarking site; index the decrypted packet data in the second cache; store the indexed packet data as a dataset in a relational database; and perform a benchmarking session on the indexed packet data.

Embodiments further provide a computer program product, wherein the program instructions further cause the processor to provide the key pair with a Time to Live (TTL) value, and if the TTL value is met, disable the key pair; wherein the indexed packet data associated with the disabled key pair is unavailable.

Embodiments further provide a computer program product, wherein the program instructions further cause the processor to extend the TTL value; and enable the key pair; wherein the indexed packet data associated with the enabled key pair is available.

Embodiments further provide a computer program product, wherein the program instructions further cause the processor to collect the packet data at the customer site, wherein the packet data is collected within a predetermined time period; encrypt the predetermined time period of the packet data using the first key of a key pair at the customer site; and transfer the encrypted packet data to the benchmarking site.

Embodiments further provide a computer program product, wherein the program instructions further cause the processor to collect a first predetermined time period of the packet data at the customer site; encrypt the first predetermined time period of the packet data using a first key of a first key pair at the customer site; transfer the first encrypted packet data to the benchmarking site; collect a second predetermined time period of the packet data at the customer site; encrypt the second predetermined time period of the packet data using a first key of a second key pair at the customer site; and transfer the second encrypted packet data to the benchmarking site. Wherein the first predetermined time period of the packet data is stored as a first dataset in the relational database; and the second predetermined time period of the packet data is stored as a second dataset in the relational database.

Embodiments further provide a computer program product, wherein a first key pair is provided with a first TTL value, and the second key pair is provided with a second TTL value.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

According to embodiments disclosed herein, an environment for secure data transfer is provided. Customer data is collected at a customer site, and is then encrypted using a first key of one symmetric key pair. The customer data is collected continuously, but segmented using a predetermined temporal interval window (i.e., a predetermined time period). For example, the customer data is collected hourly (i.e., the predetermined time period is one hour). In an embodiment, a predetermined time period of customer data, e.g., one-hour customer data, can be collected and encrypted (for each hour, the symmetric key pair is different), and placed in a stager. The staged one-hour customer data is transferred to a benchmarking site (i.e., benchmarking execution environment). The symmetric key pair is created following data privacy policies of a particular customer.

The transferred one-hour customer data is stored in a first cache (i.e., cryptcache) of the benchmarking site. The one-hour customer data stored in the first cache can be decrypted using a second key (matched with the first key) of the symmetric key pair. In an embodiment, the second key is transferred from the customer site. The decrypted one-hour customer data is then stored in a second cache (i.e., clearcache). The decrypted one-hour customer data is then indexed in the clearcache, i.e., each customer data packet is provided with an index, so that each decrypted customer data packet (in cleartext form) can be retrieved through a search. The indexed one-hour customer data (including indices and packet data in cleartext form) is then stored as a data set in a permanent storage device. Each period of customer data, e.g., each one-hour customer data is stored as a separate data set (e.g., SOLR data set), and thus there are a plurality of data sets in the permanent storage device.

In an embodiment, the symmetric key pair is refreshed periodically. Specifically, time to live (TTL) mechanism is utilized to disable the old symmetric key pair and generate the new symmetric key pair periodically. In an embodiment, different data sets are stored in different shards in the permanent storage device, to facilitate data access load balancing.

Figure 1:
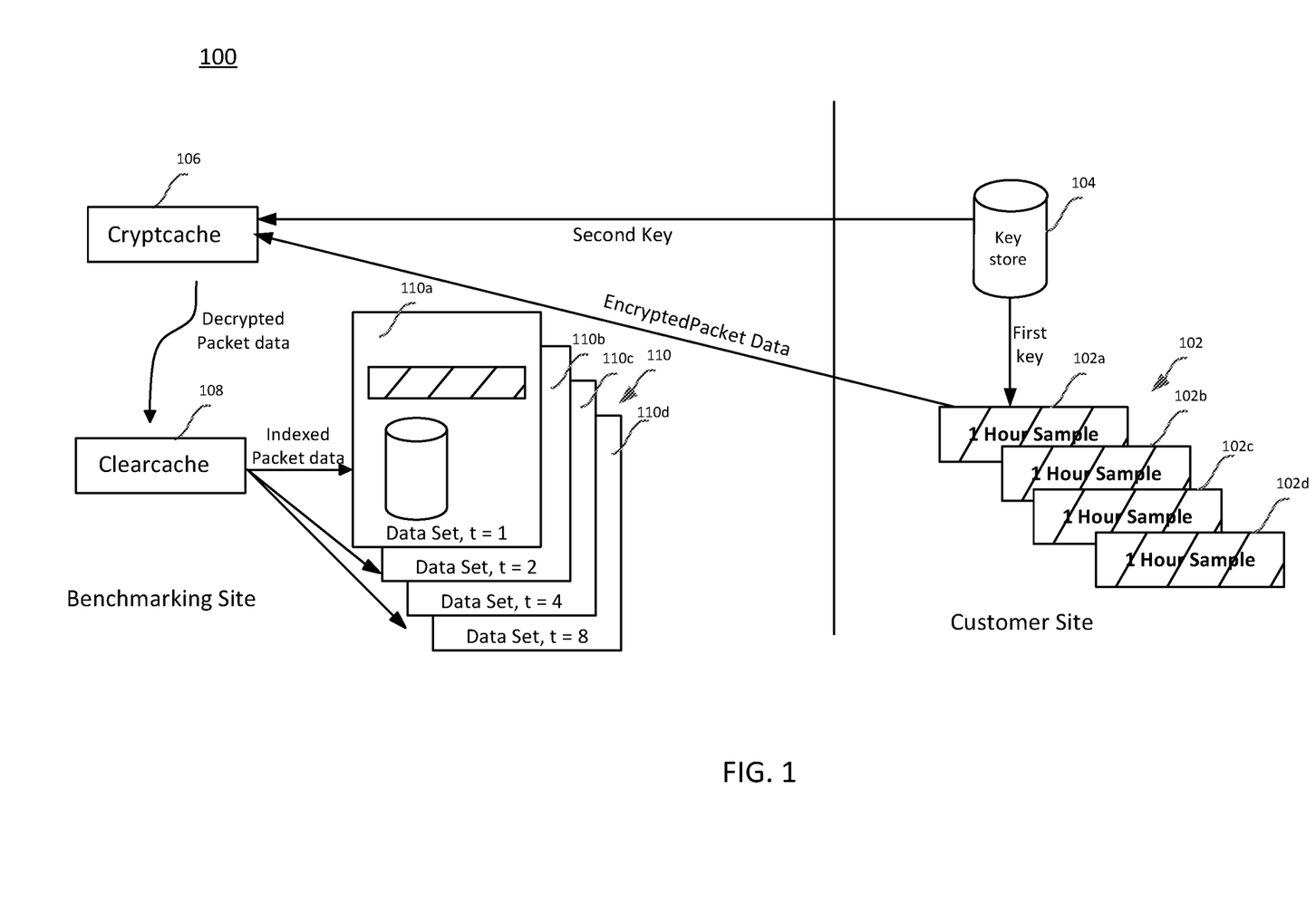
FIG. 1 is a diagram depicting an architecture 100 of transferring data between a customer site and a benchmarking site, according to embodiments provided herein.

FIG. 1 is a diagram depicting an architecture 100 of transferring data between a customer site and a benchmarking site, according to embodiments provided herein. As shown in FIG. 1, in an embodiment, the raw packet data 102 (102a, 102b, 102c, 102d . . . ) is collected on a predetermined periodic basis—e.g., an hourly basis. In another embodiment, the time period of the raw packet data 102 can be determined by customers or users, for example, based on storage capacity of a stager, a TTL value of a key pair, and processing capacity of the benchmarking site, etc. In the embodiment as shown in FIG. 1, one-hour customer data, i.e., the raw packet data 102a is encrypted using a first key (a public key) of one symmetric key pair provided by the key store 104. The encrypted data is then transferred to the cryptcache 106 located at the benchmarking site. A second key (a private key which is paired with the public key) of the same symmetric key pair is provided from the key store 104 to the cryptcache 106. The encrypted data is decrypted using the second key in the cryptcache 106. The decrypted data is then stored in the clearcache 108 in a cleartext form. The decrypted data is indexed in the clearcache 108, and then the indexed data is stored as the data set 110a. In a similar manner, the raw packet data 102b, the raw packet data 102c, and the raw packet data 102d . . . , are encrypted, transferred, decrypted, indexed, and stored as the data set 110b, the data set 110c, the data set 110d . . . , respectively. For each of raw packet data 110 (102a, 102b, 102c, 102d . . . ), the symmetric key pair is different.

Figure 2:
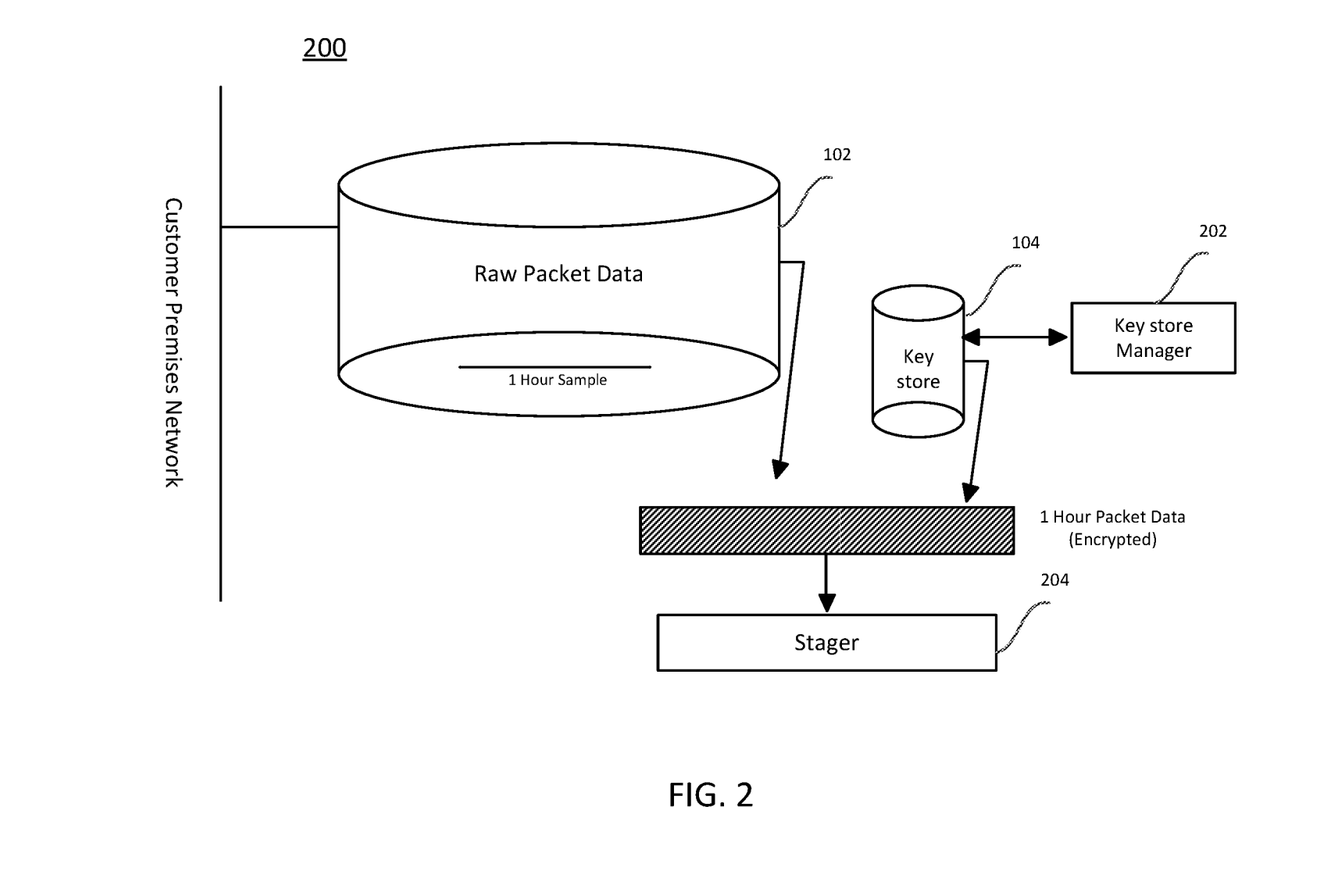
FIG. 2 is a diagram depicting an architecture 200 of a customer site, according to embodiments provided herein.
Figure 3:
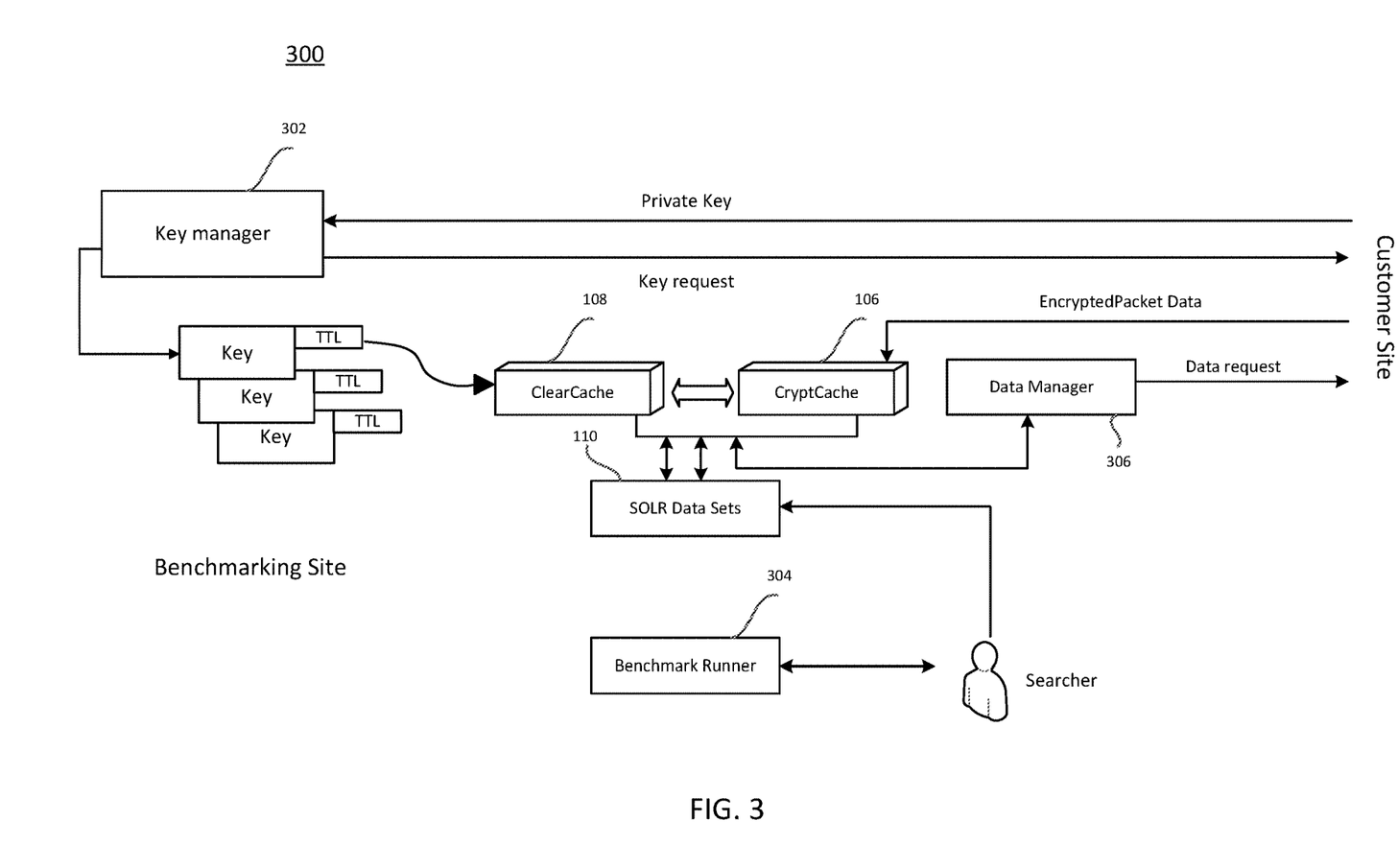
FIG. 3 is a diagram depicting an architecture 300 of a benchmarking site, according to embodiments provided herein.

FIG. 2 is a diagram depicting an architecture 200 of a customer site, according to embodiments provided herein. In an embodiment, a storage device for raw packet data 102, the key store 104, the key store manager 202 for managing the key store 104, and the stager 204 are provided at the customer site. The key store manager 202 is configured to generate symmetric key pairs and stored in the key store 104, refresh symmetric key pairs periodically, and send out symmetric key pairs in the key store 104 for encryption or decryption. In an embodiment, the encrypted data is stored in the stager 204, prior to being transferred to the benchmarking site. The stager 204 (i.e., a staging area, or landing zone), is an intermediate storage area, which is located between a data source (in this embodiment, a storage device for the raw packet data 102, not shown in FIG. 2) and a data target (in this embodiment, the cryptcache 106 as shown in FIGS. 1 and 3). The key store manager 202 may be implemented in any suitable manner using known techniques that may be hardware-based, software-based, or some combination of both. For example, the key store manager 202 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Clearcache 108 is a portion of cache memory (e.g., any level of cache memory (e.g., L1, L2, L3, etc.)) that stores an instance of a data object in cleartext form, and cryptcache 106 is a portion of cache memory (e.g., any level of cache memory (e.g., L1, L2, L3, etc.)) that stores an instance of a data object in encrypted form. In some embodiments, clearcache 108 and cryptcache 106 may comprise designated portions, blocks, entries, or lines of one or more levels of cache memory that are used to store cleartext and encrypted instances, respectively, of data being processed according to the present disclosure (e.g., exclusively). However, it should be understood that clearcache 108 and cryptcache 106 may be defined as any particular portion, block, entry, or line of cache memory that is used to store data in a cleartext or encrypted form, respectively, while such data is being processed (e.g., temporarily and/or nonexclusively). Thus, it should also be understood that while a certain entry of cache memory may be considered clearcache 108 or cryptcache 106 while storing therein the respective cleartext or encrypted form of data, such cache memory locations may also be used for other data caching purposes (e.g., identified and/or considered a clearcache 108 and/or cryptcache 106 entry only while processing data according to the present disclosure). The clearcache 108 and the cryptcache 106 each have an access time window defining an amount of time, during which the instance of the data object is accessible.

FIG. 3 is a diagram depicting an architecture 300 of a benchmarking site, according to embodiments provided herein. In an embodiment, the key manager 302, the clearcache 108, the cryptcache 106, the data sets 110 (e.g., SOLR data sets), the data manager 306, and benchmarking runner device 304 are provided at the benchmarking site. As shown in FIGS. 2 and 3, the key manger 302 is configured to monitor the TTL value for each private key transferred from the customer site, and send a key request to the key store manager 202 at the customer site. Time to live (TTL) is a mechanism that limits the lifespan or lifetime of each private key for security consideration. The TTL value is determined by customers based on the importance of the packet data, for example, TTL is set as 20 minutes by a customer for extremely sensitive and important data. In an embodiment, the TTL value is long enough to cover an entire benchmark session, for example 24 hours. In an embodiment, the TTL value of each private key is the same. In another embodiment, different private keys have different TTL values. In another embodiment, some private keys have the same TTL value, while other private keys have different TTL values. In an embodiment, for each private key, the customer will get a notification on a display screen of the customer site. For example, if a private key is going to expire, a notification that the key is going to expire in 5 minutes will be presented to the customer (or user), so that the customer can have an option to extend TTL. If the private key expires before a benchmarking session ends, the private key will be disabled and stored at key manager 302, and the associated packet data will not be available for benchmarking. If the customer extends TTL, then the private key can be re-enabled and the associated packet data are available for benchmarking again. In an embodiment, the customer also has an option to cancel the benchmark session at any time. In this case, all the packet data, indices, etc. need to be removed from the benchmark site. Specifically, the data in the clearcache 108 and the cryptcache 106 are scrubbed or removed. The indices and packet data stored in the data sets 110 are also scrubbed or removed.

The data manager 306 is configured to control filling of cryptcache 106 with the raw packet data from the customer site, and/or transferring data from cryptcache 106 to clearcache 108. In an embodiment, when the data manager 306 detects that the cryptcache 106 is empty, i.e., the decrypted data has been transferred to clearcache 108, the data manager 306 sends a data request to the customer site for new raw packet data. In another embodiment, when the data manager 306 detects that both the cryptcache 106 and clearcache 108 are empty, i.e., the indexed data has been transferred to data sets 110, the data manager 306 sends a data request to the customer site for new raw packet data.

The key manager 302 and/or the data manager 306 may be implemented in any suitable manner using known techniques that may be hardware-based, software-based, or some combination of both. For example, the key manager 302 and/or the data manager 306 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Figure 4:
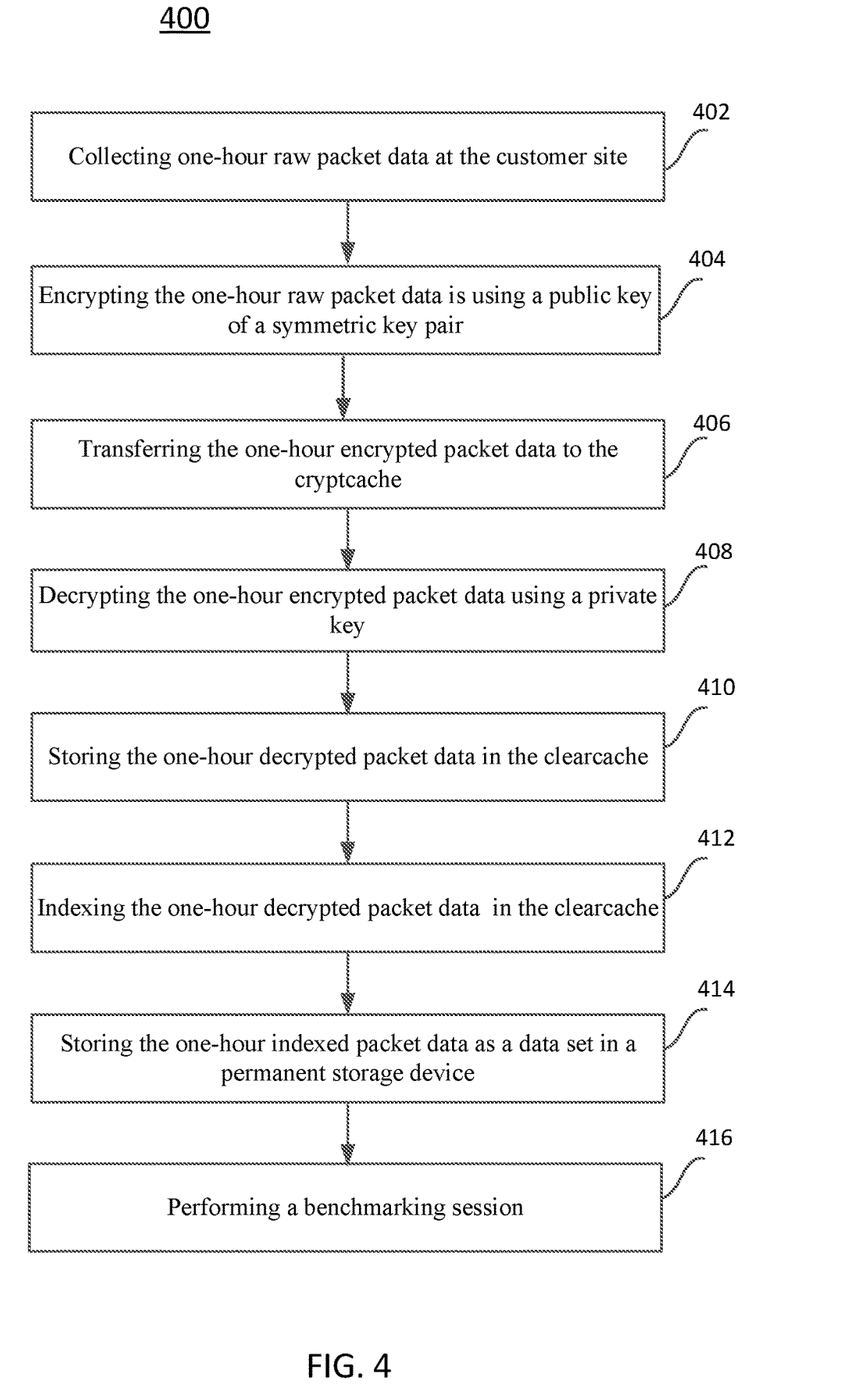
FIG. 4 is a flowchart illustrating a method 400 of transferring data between a customer site and a benchmarking site, according to embodiments provided herein.

FIG. 4 is a flowchart illustrating a method 400 of transferring data between a customer site and a benchmarking site, according to embodiments provided herein. Referring to FIGS. 1-4, at step 402, one-hour raw packet data is collected at the customer site. In an embodiment, the one-hour raw packet data can be stored in a storage device. In another embodiment, a plurality of raw packet data is stored in a storage device, and one-hour raw packet data is extracted from the plurality of raw packet data stored in the storage device. In an embodiment, the raw packet data is not indexed. In another embodiment, the raw packet data is indexed when it gets captured at the customer site.

At step 404, the one-hour raw packet data is encrypted using a public key of a symmetric key pair and stored in the stager 204. The encrypted packet data can only be decrypted using a private key of the same symmetric key pair.

At step 406, the one-hour encrypted packet data is transferred to the cryptcache 106 at the benchmarking site. The data manager 306 sends a data request to the customer site for new raw packet data. For example, the data request can be sent through an application program interface (API) and presented to customers on a graphical user interface (GUI). Upon the data request, the customer agrees to send one-hour encrypted packet data to the benchmarking site. Specifically, the one-hour encrypted packet data is transferred to the cryptcache 106.

At step 408, the one-hour encrypted packet data can be decrypted using a private key (paired with the public key) of the same symmetric key pair in the cryptcache 106. The key manager 302 at the benchmarking site requests a private key from the key store manager 202 at the customer site. The key store manager 202 sends the private key to the key manager 302, and the one-hour encrypted packet data can be decrypted using this private key. In an embodiment, the private key is re-encrypted before being transferred to the benchmarking site, because if the private key is directly sent from the customer site to the benchmarking site, the private key may be subject to a man-in-the-middle attack (MITM). A man-in-the-middle attack is an attack where the attacker secretly relays and possibly alters the communication between two parties who believe they are directly communicating with each other. After receiving the re-encrypted private key, the benchmarking site decrypts the re-encrypted private key first to get the private key, and then the one-hour encrypted packet data can be decrypted using the private key. In another embodiment, the one-hour encrypted packet data itself further contains the private key for decryption of the encrypted packet data, and thus it is unnecessary to re-encrypt the private key and send the private key to the benchmarking site. In this embodiment, both the benchmarking site and the customer site need to trust and validate each other's GPG keys.

At step 410, the one-hour decrypted packet data is stored in the clearcache 108. The transfer of one-hour decrypted packet data from the cryptcache 106 to the clearcache 108 is controlled by the data manager 306.

At step 412, the one-hour decrypted packet data is indexed in the clearcache 108. Specifically, each customer data packet is provided with an index, so that each decrypted customer data packet (in cleartext form) can be retrieved through a search. Even if the one-hour decrypted packet data was already indexed at the customer site, the one-hour decrypted packet data still needs to be re-indexed, because the customer site and the benchmarking site may have different relational databases and/or different indexing schemes.

At step 414, the one-hour indexed packet data is stored as a data set in a permanent storage device. In an embodiment, the one-hour indexed packet data is stored as a data set (e.g. a SOLR data set or other data set which can be indexed by an indexing engine). In an embodiment, each one-hour indexed packet data is stored as a separate SOLR data set (e.g. SOLR data set). SOLR has major features including full-text search, hit highlighting, faceted search, real-time indexing, dynamic clustering, database integration, NoSQL features and rich document (e.g., Word, PDF) handling. All the data sets are stored in a permanent storage device. In an embodiment, different data sets are stored in different shards in the permanent storage device. Specifically, each data set is stored in a different shard in a relational database. A database shard is a horizontal partition of data in the database or search engine. Each individual partition is referred to as a shard or database shard. Each shard is held on a separate database server instance, to spread load. Some data within the database remains present in all shards, but some data appears only in a single shard. Each shard acts as the single source for this subset of data.

At step 416, a searcher (a person or a trained search program) searches in the data set and the benchmarking session is performed based on the searched results. The benchmark runner 304 controls searching through indexed packet data for benchmarking tests. The benchmarking results can be presented with graphs or/and other outputs of structured statistical results.

In an embodiment, the method of transferring data can be provided in a multitenant cloud environment, such as Akamai or Limelight or IBM Cloud Private. The multitenant cloud service provider requires customer data to be segregated, while requiring a software provider to run a benchmark with the customer data on a separate virtual node, so that the software can be improved or tuned based on the benchmarking result. With the method of transferring data in this disclosure, the customer data can be transferred securely. The customer data, as processed by the benchmarking site, has a clear intent of applicability, has access only to the processes providing benchmarking service, and has a clear lifecycle and point of secure data construction, which is consistent with the service level agreement (SLA) with the Software as a Service (SaaS) provider, and compliant with the subject control and opt-in requirements of GDPR.

In an embodiment, the method of transferring data may be applied in event sourcing, e.g., in Security Incident and Event Monitoring (SIEM) tools, such as IBM QRadar, and Splunk. In the SIEM tools, event sourcing obtains event data and analysis of actual traffic in the form of network flows. In the event sourcing (for example, QRadar Network Insights), traffic is captured in promiscuous mode or from a switch span port, and heavily analyzed for statistical and attribute data of interest. With the method of transferring data in this disclosure, the traffic data can be transferred securely. Traffic data is provided in fully intact form for ingress into the service provider. The network traffic data is processed as flow records at the first stage of persistence into the security service. The flow data itself is indexed, and the retention window for the underlying raw traffic data terminates periodically. TTL refresh can control retention of traffic data flows for security event analysis and correlation.

Figure 5:
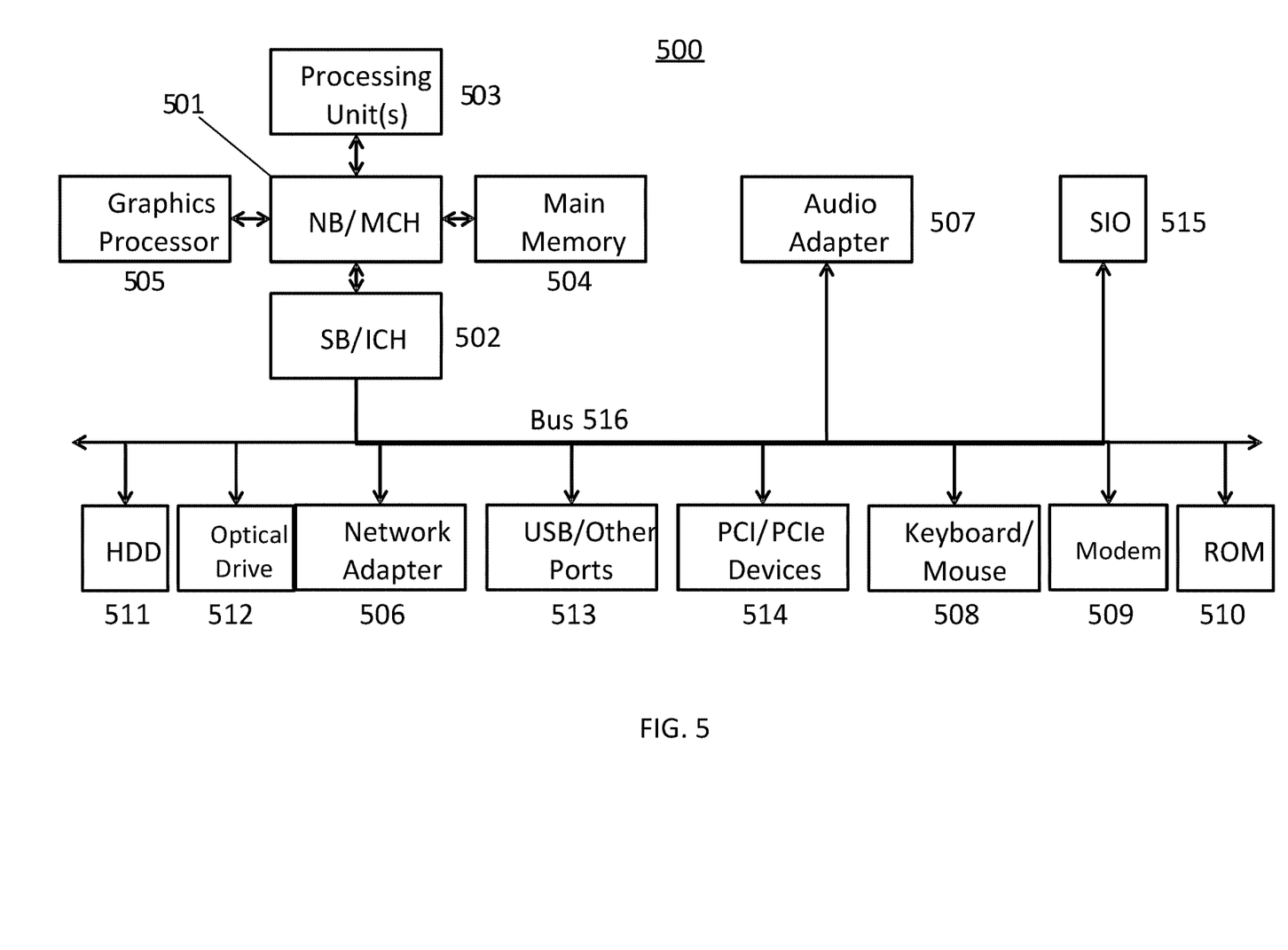
FIG. 5 is a block diagram of an example data processing system 500 in which aspects of the illustrative embodiments are implemented.

FIG. 5 is a block diagram of an example data processing system 500, such as, but not limited to, benchmarking site computer or/and customer site computer, in which aspects of the illustrative embodiments may be implemented. Data processing system 500 is an example of a computer, such as a server or client, in which computer usable code or instructions implementing the process for illustrative embodiments of the present invention are located. In one embodiment, FIG. 5 may represent a server computing device.

In the depicted example, data processing system 500 can employ a hub architecture including a north bridge and memory controller hub (NB/MCH) 501 and south bridge and input/output (I/O) controller hub (SB/ICH) 502. Processing unit 503, main memory 504, and graphics processor 505 can be connected to the NB/MCH 501. Graphics processor 505 can be connected to the NB/MCH 501 through, for example, an accelerated graphics port (AGP).

In the depicted example, a network adapter 506 connects to the SB/ICH 502. An audio adapter 507, keyboard and mouse adapter 508, modem 509, read only memory (ROM) 510, hard disk drive (HDD) 511, optical drive (e.g., CD or DVD) 512, universal serial bus (USB) ports and other communication ports 513, and PCI/PCIe devices 514 may connect to the SB/ICH 502 through bus system 516. PCI/PCIe devices 514 may include Ethernet adapters, add-in cards, and PC cards for notebook computers. ROM 510 may be, for example, a flash basic input/output system (BIOS). The HDD 511 and optical drive 512 can use an integrated drive electronics (IDE) or serial advanced technology attachment (SATA) interface. A super I/O (SIO) device 515 can be connected to the SB/ICH 502.

An operating system can run on processing unit 503. The operating system can coordinate and provide control of various components within the data processing system 500. As a client, the operating system can be a commercially available operating system. An object-oriented programming system, such as the Java™ programming system, may run in conjunction with the operating system and provide calls to the operating system from the object-oriented programs or applications executing on the data processing system 500. As a server, the data processing system 500 can be an IBM® eServer™ System p® running the Advanced Interactive Executive operating system or the Linux operating system. The data processing system 500 can be a symmetric multiprocessor (SMP) system that can include a plurality of processors in the processing unit 503. Alternatively, a single processor system may be employed.

Instructions for the operating system, the object-oriented programming system, and applications or programs are located on storage devices, such as the HDD 511, and are loaded into the main memory 504 for execution by the processing unit 503. The processes for embodiments described herein can be performed by the processing unit 503 using computer usable program code, which can be located in a memory such as, for example, main memory 504, ROM 510, or in one or more peripheral devices.

A bus system 516 can be comprised of one or more busses. The bus system 516 can be implemented using any type of communication fabric or architecture that can provide for a transfer of data between different components or devices attached to the fabric or architecture. A communication unit such as the modem 509 or the network adapter 506 can include one or more devices that can be used to transmit and receive data.

Those of ordinary skill in the art will appreciate that the hardware depicted in FIG. 5 may vary depending on the implementation. Other internal hardware or peripheral devices, such as flash memory, equivalent non-volatile memory, or optical disk drives may be used in addition to or in place of the hardware depicted. Moreover, the data processing system 500 can take the form of any of a number of different data processing systems, including but not limited to, client computing devices, server computing devices, tablet computers, laptop computers, telephone or other communication devices, personal digital assistants, and the like. Essentially, data processing system 500 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method in a data processing system comprising a processor and a memory comprising instructions, which are executed by the processor to cause the processor to implement the method of transferring data between a customer site and a benchmarking site, comprising:

receiving, from the customer site, encrypted packet data collected from within a predetermined timed period, wherein the packet data is encrypted using a first key of a key pair comprising a Time to Live (TTL) value;

storing the encrypted packet data, by the processor, in a first cache memory at the benchmarking site, wherein the first cache memory has a first access time window, and the encrypted packet data is accessible only during the first access time window;

decrypting the encrypted packet data in the first cache memory, by the processor, using a second key of the key pair;

storing decrypted packet data, by the processor, in a second cache memory at the benchmarking site, wherein the second cache memory has a second access time window, and the decrypted packet data is accessible only during the second access time window;

indexing the decrypted packet data in the second cache memory;

storing indexed packet data as a dataset in a permanent storage device, wherein the indexed packet becomes unavailable in response to the TTL value of the key pair being met, and wherein the indexed packet becomes available in response to the TTL value of the key pair being re-extended;

performing a benchmarking session on the indexed packet data, wherein the predetermined time period is determined based on the TTL value of the key pair and a processing capacity of the benchmarking site.

2. The method of claim 1, further comprising: encrypting the predetermined time period of the packet data collected within the predetermined time period using the first key of the key pair at the customer site; and transferring the encrypted packet data to the benchmarking site.

3. The method of claim 2, further comprising:

collecting a first predetermined time period of the packet data at the customer site;

encrypting the first predetermined time period of the packet data using a first key of a first key pair at the customer site;

transferring the first encrypted packet data to the benchmarking site;

collecting a second predetermined time period of the packet data at the customer site;

encrypting the second predetermined time period of the packet data using a first key of a second key pair at the customer site; and transferring the second encrypted packet data to the benchmarking site;

wherein the first predetermined time period of the packet data is stored as a first dataset in the permanent storage device; and the second predetermined time period of the packet data is stored as a second dataset in the permanent storage device.

4. The method of claim 3, wherein data sets are stored as different shards in the permanent storage device.

5. The method of claim 3, wherein a first key pair is provided with a first TTL value, and the second key pair is provided with a second TTL value.

6. A system for transferring packet data between a customer site and a benchmarking site, the system comprising:

a first cache memory located at the benchmarking site, and configured for storing the packet data in an encrypted form;

a second cache memory located at the benchmarking site, and configured for storing the packet data in a cleartext form;

a relational database located at the benchmarking site, configured for storing indexed packet data; and a data transfer processor configured to:

receive, from the customer site, encrypted packet data collected from within a predetermined timed period, wherein the packet data is encrypted using a first key of a key pair comprising a Time to Live (TTL) value;

store the encrypted packet data in the first cache memory, wherein the first cache memory has a first access time window, and the encrypted packet data is accessible only during the first access time window;

decrypt the encrypted packet data in the first cache memory using a second key of the key pair;

store decrypted packet data in the second cache memory, wherein the second cache memory has a second access time window, and the decrypted packet data is accessible only during the second access time window;

index the decrypted packet data in the second cache memory;

store the indexed packet data as a dataset in the relational database, wherein the indexed packet becomes unavailable in response to the TTL value of the key pair being met, and wherein the indexed packet becomes available in response to the TTL value of the key pair being re-extended;

perform a benchmarking session on the indexed packet data, wherein the predetermined time period is determined based on the TTL value of the key pair and a processing capacity of the benchmarking site.

7. The system of claim 6, wherein the dataset is a SOLR data set.

8. The system of claim 6, wherein the data transfer processor is further configured to:

encrypt the packet data collected within the predetermined time period using the first key of a key pair at the customer site; and transfer the encrypted packet data to the benchmarking site.

9. The system of claim 8, wherein the data transfer processor is further configured to:

collect a first predetermined time period of the packet data at the customer site;

encrypt the first predetermined time period of the packet data using a first key of a first key pair at the customer site;

transfer the first encrypted packet data to the benchmarking site;

collect a second predetermined time period of the packet data at the customer site;

encrypt the second predetermined time period of the packet data using a first key of a second key pair at the customer site; and transfer the second encrypted packet data to the benchmarking site;

wherein the first predetermined time period of the packet data is stored as a first dataset in the relational database; and the second predetermined time period of the packet data is stored as a second dataset in the relational database.

10. The system of claim 9, wherein data sets are stored as different shards in the relational database.

11. The system of claim 9, wherein the data transfer processor is further configured to:
cancel the benchmarking session; and
remove the indexed packet data from the benchmarking site.

12. A computer program product for reading skill assessment, the computer program product comprising a non-transitory computer readable storage medium having program instructions embodied therewith, the program instructions executable by a processor to cause the processor to:
receive, from the customer site, encrypted packet data collected from within a predetermined timed period, wherein the packet data is encrypted using a first key of a key pair comprising a Time to Live (TTL) value;
store the encrypted packet data in a first cache memory at the benchmarking site, wherein the first cache memory has a first access time window, and the encrypted packet data is accessible only during the first access time window;
decrypt the encrypted packet data in the first cache memory using a second key of the key pair; store decrypted packet data in a second cache memory at the benchmarking site, wherein the second cache memory has a second access time window, and the decrypted packet data is accessible only during the second access time window;
index the decrypted packet data in the second cache memory;
store the indexed packet data as a dataset in a relational database, wherein the indexed packet becomes unavailable in response to the TTL value of the key pair being met, and wherein the indexed packet becomes available in response to the TTL value of the key pair being re-extended;
perform a benchmarking session on the indexed packet data, wherein the predetermined time period is determined based on the TTL value of the key pair and a processing capacity of the benchmarking site.

13. The computer program product of claim 12, wherein the program instructions further cause the processor to:
encrypt the predetermined time period of the packet data collected within the predetermined time period using the first key of a key pair at the customer site; and
transfer the encrypted packet data to the benchmarking site.

14. The computer program product of claim 13, wherein the program instructions further cause the processor to
collect a first predetermined time period of the packet data at the customer site;
encrypt the first predetermined time period of the packet data using a first key of a first key pair at the customer site;
transfer the first encrypted packet data to the benchmarking site;
collect a second predetermined time period of the packet data at the customer site;
encrypt the second predetermined time period of the packet data using a first key of a second key pair at the customer site; and
transfer the second encrypted packet data to the benchmarking site;
wherein the first predetermined time period of the packet data is stored as a first dataset in the relational database; and the second predetermined time period of the packet data is stored as a second dataset in the relational database.

15. The computer program product of claim 14, wherein a first key pair is provided with a first TTL value, and the second key pair is provided with a second TTL value.

* * * * *